C. CHRISTENSEN & C. W. NOONEN.
CULTIVATOR.
APPLICATION FILED OCT. 28, 1907.
1,043,202.
Patented Nov. 5, 1912.
7 SHEETS—SHEET 1.
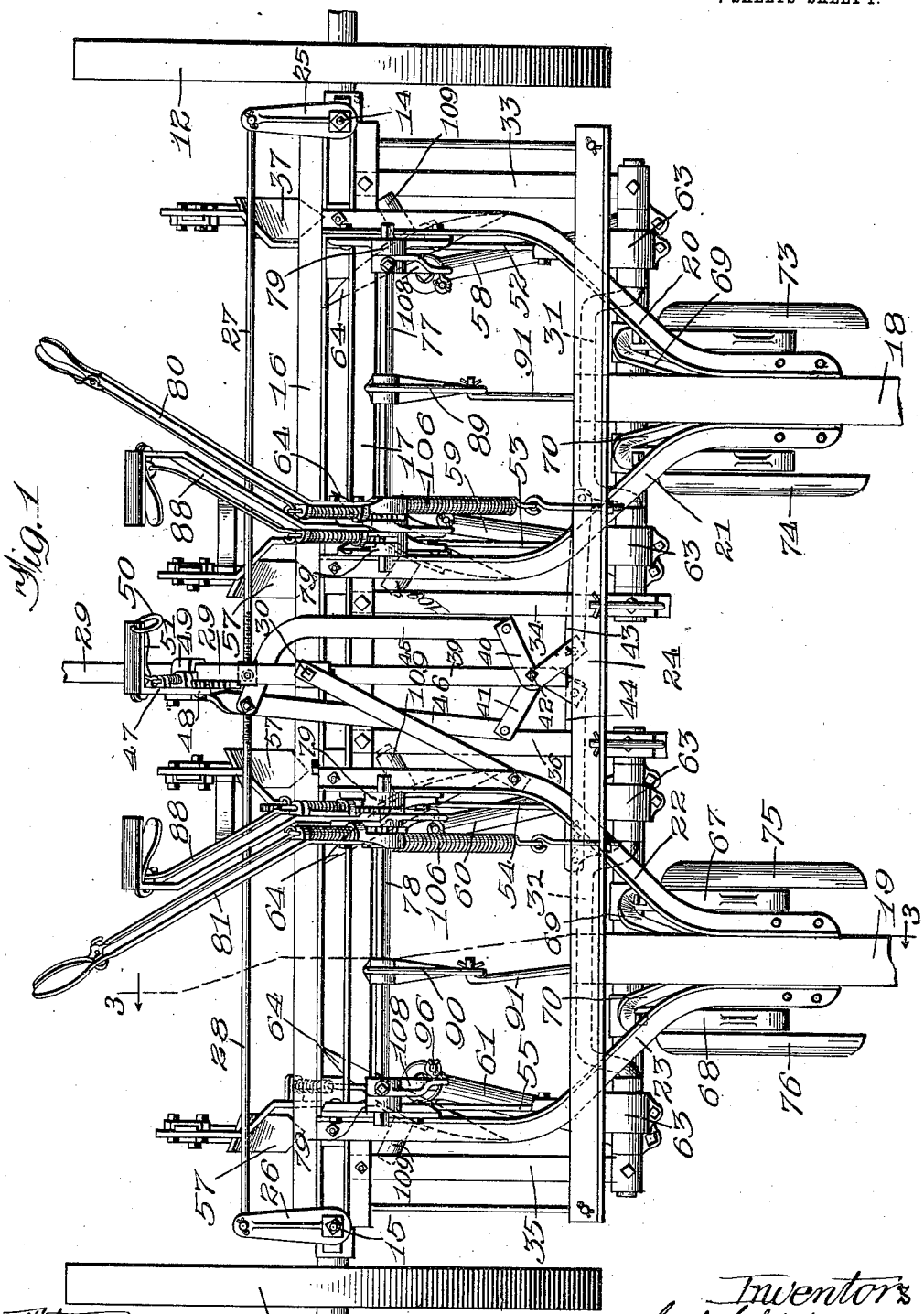

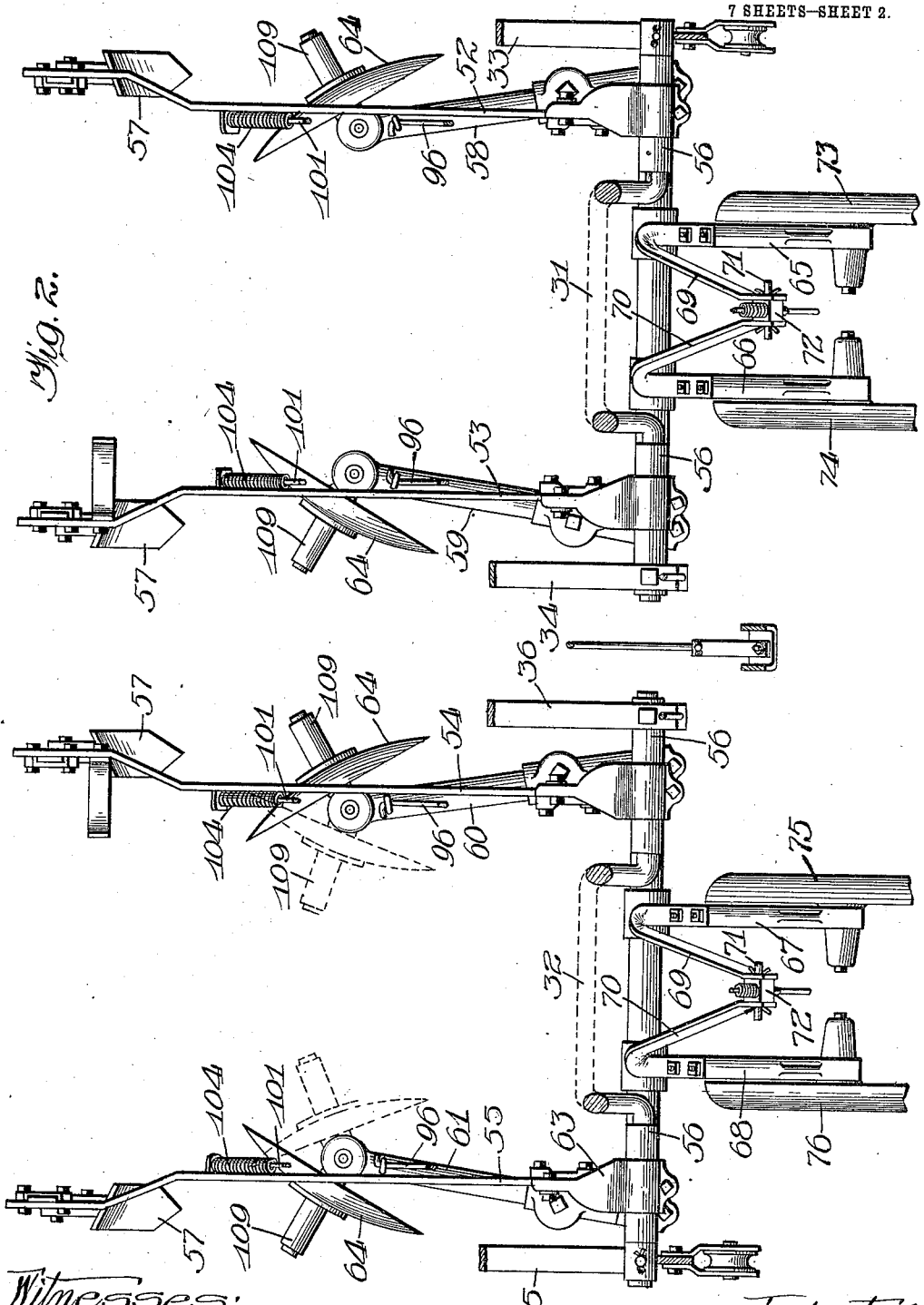

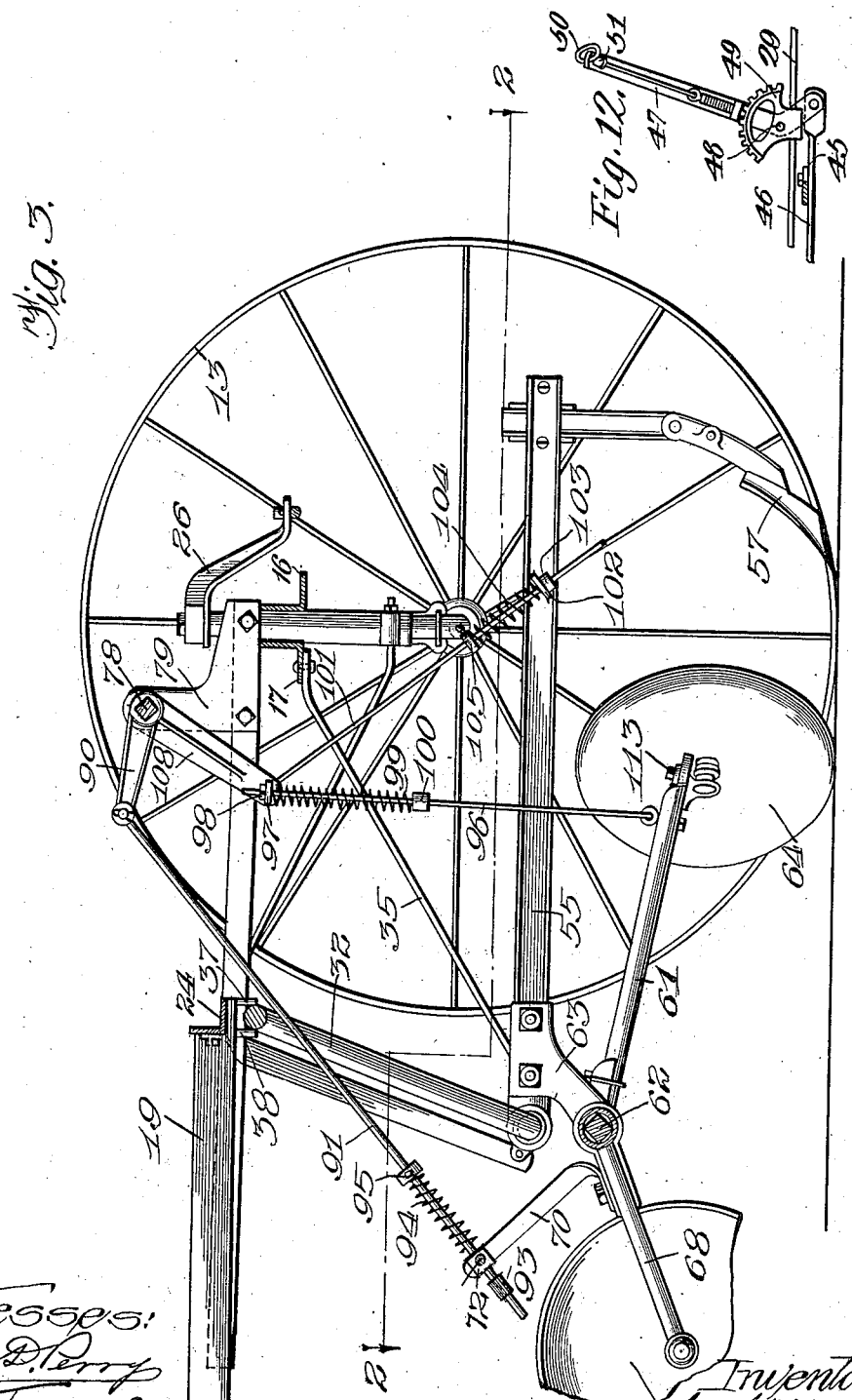

C. CHRISTENSEN & C. W. NOONEN.
CULTIVATOR.
APPLICATION FILED OCT. 28, 1907.
1,043,202.
Patented Nov. 5, 1912.
7 SHEETS—SHEET 4.
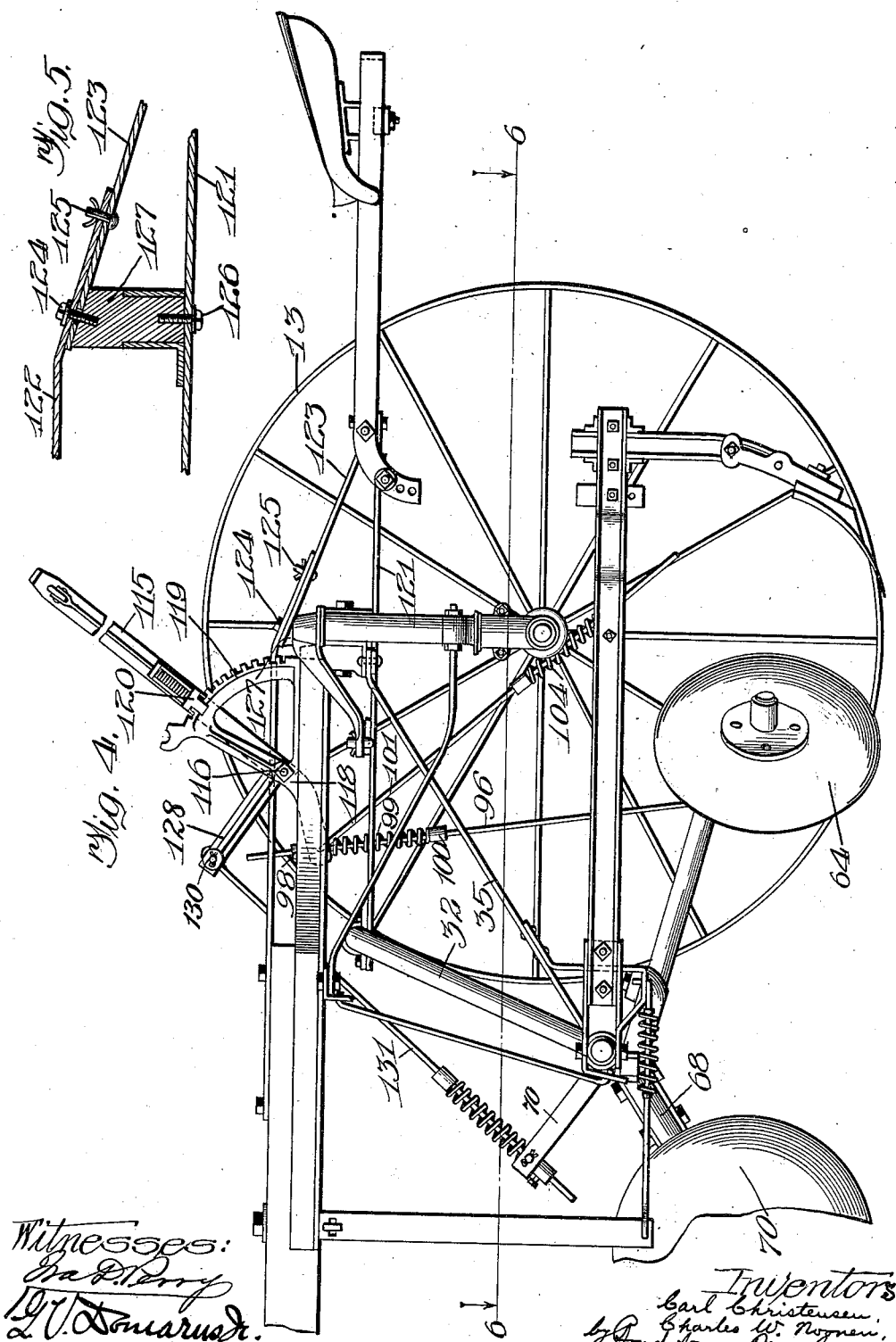

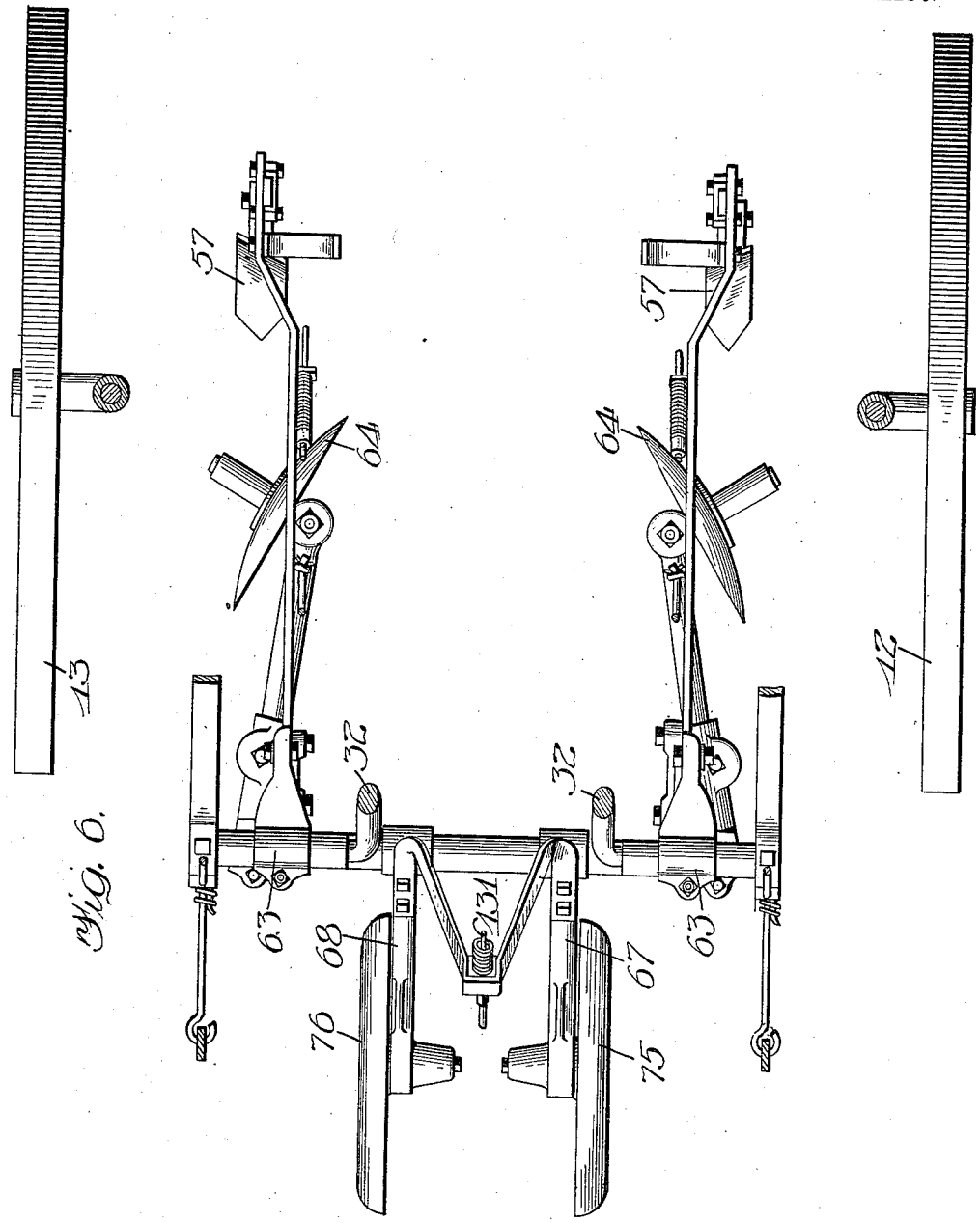

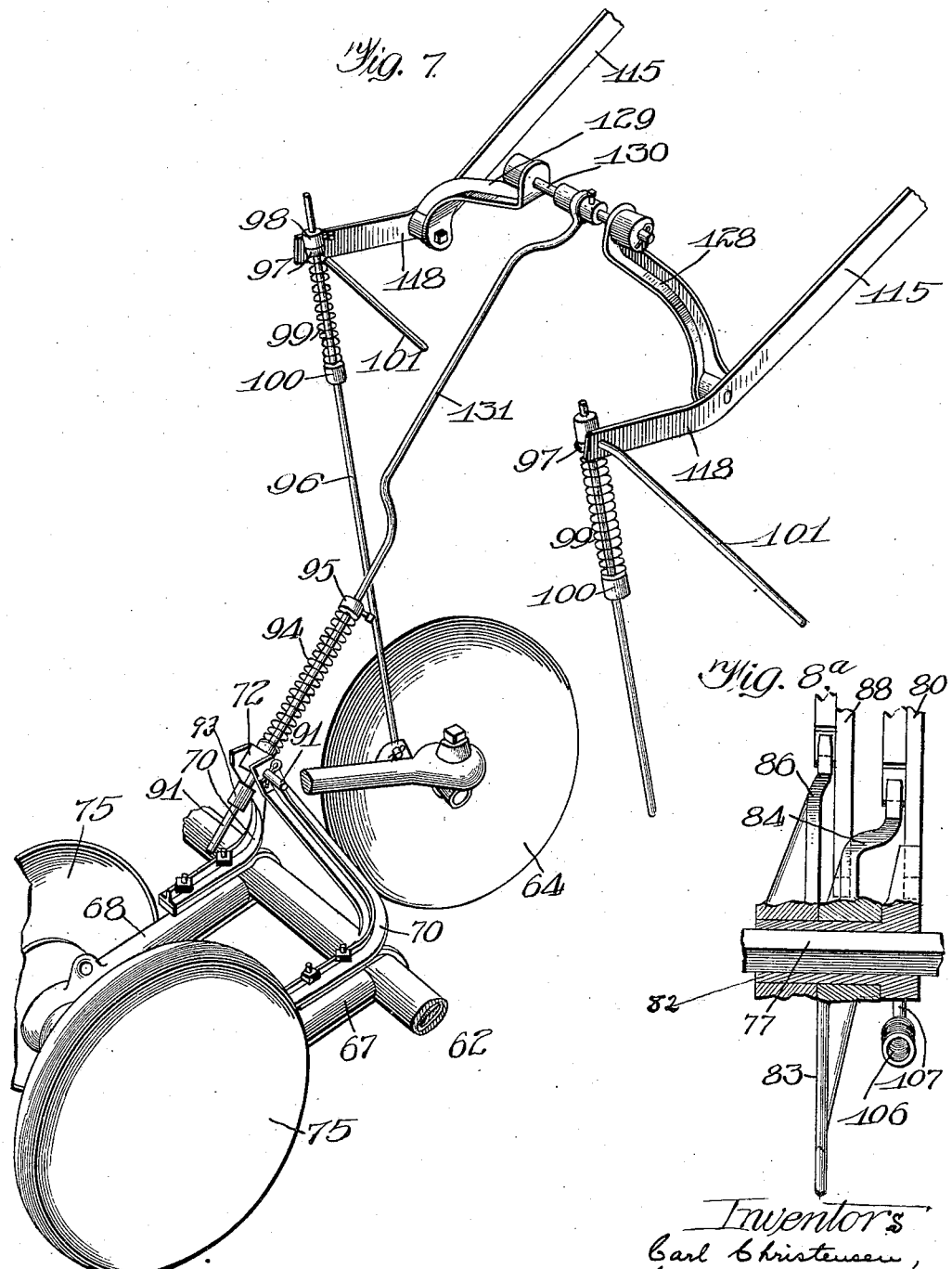

C. CHRISTENSEN & C. W. NOONEN.
CULTIVATOR.
APPLICATION FILED OCT. 28, 1907.
1,043,202.
Patented Nov. 5, 1912.
7 SHEETS—SHEET 7.
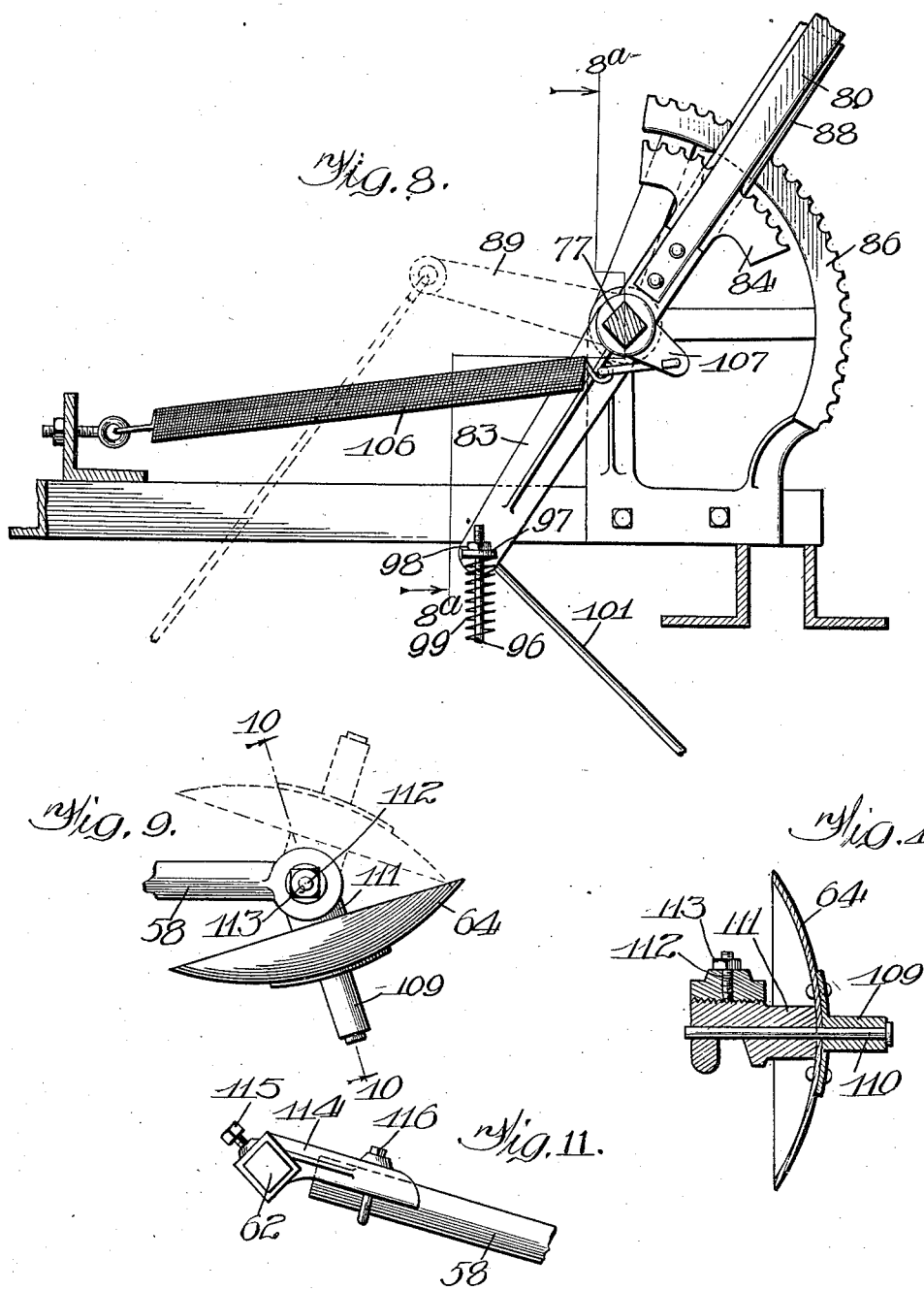

UNITED STATES PATENT OFFICE.

CARL CHRISTENSEN, OF BRADLEY, ILLINOIS, AND CHARLES W. NOONEN, OF COUNCIL BLUFFS, IOWA, ASSIGNORS, BY MESNE ASSIGNMENTS, TO SEARS, ROEBUCK & COMPANY, OF CHICAGO, ILLINOIS, A CORPORATION OF NEW YORK.

CULTIVATOR.

1,043,202.   Specification of Letters Patent.   Patented Nov. 5, 1912.

Application filed October 28, 1907. Serial No. 399,457.

*To all whom it may concern:*

Be it known that we, CARL CHRISTENSEN and CHARLES W. NOONEN, citizens of the United States, and residing at Bradley, in the county of Kankakee and State of Illinois, and at Council Bluffs, in the county of Pottawattamie and State of Iowa, respectively, have invented certain new and useful Improvements in Cultivators, of which the following is a specification, reference being had to the accompanying drawings.

Our invention relates to agricultural implements, and has for its object to provide certain improvements in cultivators.

One of such improvements has to do particularly with cultivators of the two-row type, such as that illustrated and described in patent to W. L. and W. A. Paul, No. 836,779, granted November 27, 1906, and consists in an improved arrangement of mechanism for varying the distance between the pairs of cultivator gangs.

Another important feature consists in providing an attachment for carrying cultivator disks in substitution for shovels and in so constructing the supporting devices that the disks may be set to throw the dirt either toward or away from the plants so that the machine is well adapted to treating listed corn. For such use it is desirable that the field be cultivated for the first time with the disks set so as to cut the weeds at each side of the trench in which the corn is planted, and for this purpose the disks of each pair are arranged so that the front edges are closer together than the rear edges, their concave sides being on the outside, and consequently act to throw the dirt outward. For the second cultivation the disks of each pair are set with their leading edges farther apart than their rear edges, their concave sides being on the inside, so that they then act to throw the dirt toward the trench. By our invention we provide an improved construction by which these different operations may be readily performed by simply swinging the disks around from one position to the other. Our improved attachment is designed to be put on the regular cultivator frame after taking off the original beams and shovels, so that the cultivator may be readapted for flat cultivation by simply restoring the original beams and shovels.

A further improved feature of importance is the provision of two guide disks or wheels arranged in front of each gang in order to make the machine steadier in operation and to guide it properly.

In addition to these features above mentioned, by our invention we provide certain other improvements which will be hereinafter particularly pointed out.

What we regard as new is set forth in the claims.

In the accompanying drawings,—Figure 1 is a plan view of our improved cultivator, showing the application of our several improvements to a cultivator of the two-row type; Fig. 2 is a horizontal section on line 2—8 of Fig. 3, illustrating the guide disks or wheels and the cultivator gangs; Fig. 3 is a longitudinal vertical section, being substantially a section on line 3—3 of Fig. 1; Fig. 4 is a side elevation, one wheel being removed, showing the application of our improvements to a cultivator of the single-row type; Fig. 5 is an enlarged detail, being a sectional view, illustrating the connection by which the seat is supported; Fig. 6 is a horizontal section on line 6—6 of Fig. 4; Fig. 7 is a perspective view, illustrating in part the arrangement of the connections of the guide wheels or disks and the cultivator disk in a single row cultivator; Fig. 8 is a view, showing the connections of the lifting lever; Fig. 8$^a$ is a sectional view, illustrating the manner in which the lifting levers are mounted; Fig. 9 is a detail, being a plan view, illustrating the manner of mounting the cultivator disks; Fig. 10 is a section on line 10—10 of Fig. 9; Fig. 11 is a side view, illustrating the manner in which the beams which support the cultivator disks are connected with the front arch or arches, and Fig. 12 is a side view illustrating the lever which operates the spreading devices.

In the two-row cultivator illustrated and described in the Paul and Paul Patent, No. 836,779, hereinbefore referred to, there is a wheeled frame in which the wheels are so supported as to turn in parallelism about vertical pivots, the wheels being connected with a laterally-swinging seat-support, so that by swinging said seat-support to one side or the other the wheels may be turned in one direction or the other to vary the direction of travel of the machine. The cultivator gangs are connected at their forward ends with arches at the front of the machine, said arches being also connected with the seat-support so that when the wheels are turned the arches are moved in a corresponding direction and the cultivator consequently kept in proper operative position with respect to the new line of travel of the machine. The two arches referred to are placed end to end, being normally in the same vertical plane. Suitable mechanism is provided for moving said arches toward or from each other to vary the space between the adjacent gangs. These features are all found in our present application. By our present invention, however, we provide improved means for adjusting the front arches toward and from each other and also mechanism by which the seat-support may be locked so that it cannot swing laterally, as is desirable when using the machine for certain purposes. The arrangement of the devices for shifting the arches laterally is best shown in Fig. 1. As therein shown, 12—13 indicate the carrying wheels, which are mounted to turn about vertical spindles 14—15 carried at the ends of the frame of the machine, the rear portion of which, as shown in Fig. 1, is composed of oppositely-disposed angle-irons 16—17 which extend transversely of the machine.

18—19 indicate tongues or poles secured between angle-irons 20—21 and 22—23, respectively, which are secured at their rear ends to the members 16—17 of the frame and are connected to and braced by an angle-iron 24 which extends across the machine near the forward portion thereof, as shown in Fig. 1, thus forming a rigid frame which supports the various parts of the mechanism. 25—26 indicate arms non-rotatively connected with the upper ends of the spindles 14—15, respectively, said arms being connected by cross-rods 27—28 with a seat-support 29, which is mounted on a pivot 30 at the center of the rear portion of the frame of the machine, as illustrated in Fig. 1. The arrangement is such that said seat-support may swing laterally and consequently acts to turn the wheels 12—13 to one side or the other and consequently change the direction of travel of the machine.

31—32 indicate arches arranged substantially under the angle-iron 24 at the front of the machine frame and connected with the rear portion of said frame by links 33—34 35—36, respectively, which are pivotally connected at their rear ends with the rear end-portion of the frame of the machine, as shown in Fig. 3. As also shown in Fig. 3, depending straps or bars 37—38 are provided at the under side of the bar 24 for guiding the arches as they move laterally.

39 indicates that portion of the seat-support which extends forward of the pivot 30. 40—41 indicate bell-crank levers mounted on a pivot 42 at the front end-portion 39 of the seat-support, so that they rock in a substantially horizontal plane. 43—44 indicate links connecting the forwardly-extending arms of said bell-crank levers with the arches 31—32. 45—46 indicate bars connecting the rear arms of said bell-crank levers 40—41 with a lever 47 fulcrumed on the seat-support 29. The arrangement is such that by operating said lever the bell-crank levers 40—41 may be rocked, thereby moving the arches toward or from each other. The lever 47 is provided with a rack 48 and dog 49 for locking it in different positions of adjustment. It is also provided with a ring 50, or other equivalent means, for engaging a latch 51, by which the dog 49 is operated and holding the dog out of operative position. The object of this arrangement is to permit the operator to "float" the arches, or, in other words, to leave them free to move toward and from each other freely.

In practice the expanding lever 47 is floated as long as the ditches or trenches remain, but after the ditches are gone and the ground becomes comparatively level the lever is locked in position to hold the arches at the desired distance apart. While the expanding lever is left unlocked as described, the gangs follow the rows naturally, but when the trenches are filled in it is necessary to lock the gangs in position to cause them to operate properly. Instead of using the ring 50 for locking the latch of the expanding lever out of operation any other equivalent means may be employed.

As shown in Fig. 2, 52—53—54—55 indicate cultivator beams, which are connected respectively with the end portions of the arches 31—32. Said beams are connected with the arches by sleeves 56 so that they may swing vertically but their connections are laterally rigid and thereby prevent the beams from swinging laterally independently of their respective arches. 57 indicates cultivator shovels carried at the rear ends of the several beams.

58—59—60—61 indicate auxiliary beams connected at their forward ends with shafts 62, respectively, which are rotatably supported under the arches 31—32, respectively, being carried by brackets 63 which are connected to the forward ends of the beams 52 to 55, respectively, (see Fig. 3). The auxiliary beams 58 to 61 extend under the several beams 52 to 55 and carry cultivator disks 64, as shown in Figs. 2 and 3. The manner in which the disks 64 are connected with the beams 58 to 61 will be hereinafter particularly described.

65—66—67—68 indicate arms, which are pivotally connected at their rear ends with the shafts 62, said arms being arranged in pairs centrally of their respective shafts and being connected by braces 69—70, as shown in Fig. 2. The braces of each pair extend upward and forward and are connected at their forward ends by pins 71 passing through said braces and through a spacing block 72, as shown in Figs. 2 and 3.

73—74—75—76 indicate guide disks or wheels journaled at the forward ends of the arms 65—66 67—68, respectively, as shown in Fig. 2.

77—78 (Fig. 1) indicate rock shafts, which are mounted in suitable brackets 79 secured to the rear portion of the frame, as shown in Figs. 1 and 3. 80—81 indicate lifting levers mounted on the shafts 77—78, respectively, so as to turn with said shafts. For this purpose the levers 80—81 are provided at their inner ends with sleeves 82 having a squared opening which fits upon the shaft, the outer surface of the sleeve being circular to form a bearing for other parts of the mechanism, as hereinafter described. 83 indicates an arm mounted between its ends upon the sleeve 82 and having at its upper end a segmental rack 84 which is adapted to be engaged by a dog 85 carried by the lever 80, or the lever 81, as the case may be. 86 indicates another segmental rack, which is mounted on the frame of the machine and receives the sleeve 82 which it serves to support, as shown in Fig. 8ª. Said rack is adapted to be engaged by a dog 87 carried by a second lever 88, one end of which is rigidly secured to the rack 84 and is arranged parallel with and adjacent to each of the levers 80 and 81, as shown in Fig. 1. By this construction, when the lever 88 is locked to the rack 86 the rack 84 is also held against movement and consequently may then serve to lock the lever 80 in position. By unlocking the lever 88, said lever may be moved to actuate the lever 80 or 81 also. Either lever 80 or 81 may be operated independently by releasing it from engagement with the adjacent rack 84. The levers 80—81 and 88 serve as a means of raising and lowering the cultivating devices as well as the guide disks, as will hereinafter appear.

89—90 indicate forwardly-projecting arms secured intermediately of the shafts 77—78, as shown in Fig. 1, and connected by rods 91 with the arms 69—70 of the guide disks (see Fig. 3). The lower ends of said rods 91 pass through the blocks 72 and are provided with nuts 93 below said blocks as shown in Fig. 7 so that when the arm 90 is raised the guide disks are lifted, turning about the shaft 62 as an axis. A spring 94 is mounted on each rod 91, its lower end bearing against the block 72 and its upper end against a stop 95 mounted on and secured to the rod, as shown in Fig. 3. Thus the spring acts to hold the guide disks yieldingly in contact with the ground.

108 indicates arms connected with the shafts 77—78, respectively, near their outer ends and projecting downward and forward therefrom at an angle with the arms 90. The lower end of each of the arms 108 is in like manner connected with the rear end-portion of the outer beams 58—61 of the two pairs of gangs, as shown in Fig. 3, a rod 96 being provided which is connected at its lower end with the beam 58 or 61, as the case may be, and at its upper end passing through a lug 97 carried by the corresponding arm 108, as shown in Fig. 3. A nut 98 is provided above the lug 97 and a spring 99 is placed on the rod 96 below the lug 97 and above a stop 100 carried by the rod 96. Thus the outer disks 64 are held yieldingly in contact with the ground by the spring 99. Said arms 108 are also connected by connecting rods 101 with the adjacent beams 52 and 55, which at their upper ends are connected with said arms 108 and at their lower ends pass through lugs 102 carried by said beams, nuts 103 being placed on said rods 101 below the lugs 102. Springs 104 are placed on the rods 101 and are confined by the lugs 102 and stops 105 on the rods 101.

106 indicates springs connected at their forward ends to the angle-iron 24 of the frame, or other suitable support, and at their rear ends connected to a short arm 107 carried by the sleeve 82 of the lever 80 or 81, as the case may be. The springs 106 act to help in operating the levers 80, 81 and 88.

The lower ends of the levers 83 are connected to the underlying beams 53—59 and 54—60, respectively, by connecting rods similar to the connecting rods 91, 96 and 101, having the same arrangement and equipment so that they are indicated by the same letters of reference (see Fig. 8).

From the foregoing description it will be seen that by releasing the levers 80—81 from their segmental racks 84 the shafts 77—78 may be rocked independently of the levers 83 and 88, thus providing for lifting the outer beams and the front guide disks without lifting the inner beams, the latter being pivotally connected with the shafts 62; or, if desired, the inner beams may be raised and lowered by operating the levers 88 without raising and lowering the outer beams or the front guide disks,—this being accomplished by unlocking both levers 80, 81 and levers 88 and keeping the levers 80—81 still while the levers 88 are operated. If desired, each pair of levers 80—88 or 81—88 may be operated simultaneously by operating the levers 88 without releasing the levers 80—81 from their respective segments 84. This arrangement of the locking levers is not herein claimed, as it is not a part of our invention, being described and claimed in the Paul and Paul patent hereinbefore referred to.

In order that the disks of each pair of gangs may be set to throw the dirt either in or out, as desired, we provide means by which they may be readily adjusted to vary their angular relation to each other and to the line of movement of the machine. As best shown in Figs. 9 and 10, the disks 64 are provided at their convex sides with hubs 109 which fit upon axles 110 secured in sleeves 111. The sleeves 111 are arranged to be secured to the rear ends of the beams 58—61, as shown in Fig. 9. The upper surfaces of the inner end-portions of said sleeves are adapted to fit against the under end-portions of said beams and are secured thereto by bolts 112, which are preferably formed on the sleeves 111 and pass through suitable sockets in said beams, as shown in Fig. 10, being secured by nuts 113. The bearing faces of the sleeves 111 and the rear portions of the beams 58 to 61 are roughened or ribbed so that the sleeves may be secured in different angular positions relatively to the beams, as shown in Fig. 9. As indicated by dotted lines in Figs. 2 and 9, the disks may be swung from one side to the other of their respective beams, turning about the bolt 112 as an axis, and thus may be arranged to throw the dirt toward or from the trench.

In Fig. 11 we have illustrated our preferred manner of securing the beams 58 and 61 to the shafts 62, said beams being secured to the rear end-portions of castings 114, each of which is provided with a squared head adapted to fit upon the shaft 62 and held in position by a set-screw 115. An eye-bolt 116 serves to hold the beam to the casting 114. The beams 59—60 are rotatably connected with the shafts 62 as hereinbefore described.

In Figs 4, 6 and 7 we have illustrated our improvements as applied to a single-row cultivator, the arrangement of the parts being very much the same as that already described, except that there being only two gangs of cultivating devices the arrangement of the lifting devices is somewhat modified and provision is made for locking the seat-support against lateral movement about its pivot, so that when desired the seat may be held in an immovable position. Also, as shown in Fig. 4, in a single-row cultivator we prefer to extend the arms 25—26 to the front instead of to the rear and connect them to the seat support 29 forward of the pivot thereof. As shown in Figs. 4 and 7, instead of the four lifting levers shown in Fig. 1, only two levers 115 are employed, each of said levers being pivoted directly upon the frame, as shown at 116 in Fig. 4, and being provided with an arm 118 corresponding with the arm 108. A rack 119 and the usual locking dog 120 are provided for locking each of said levers in position.

In Fig. 5 we have illustrated an arrangement by which the seat-support may be locked against lateral swinging. As therein shown, the forward portion of the seat-support is composed of a lower member 121 and an upper member composed of two bars 122—123 connected together by bolts 124—125, which pass through overlapping portions of the bars 122—123. 126 indicates a pivot which connects the lower member 121 with the frame of the machine through a block 127. The bar 122 of the seat-support extends forward and is rigidly connected to the tongue, and as it is connected to the block 127 by the bolt 124 it is rigidly held in position. When, therefore, the bar 123 is connected to the bar 122 by the bolts 124—125 the seat-support is prevented from swinging, and it may be released and permitted to rock about the pivot 126 by removing the bolt 125.

In the single-row construction instead of using the shafts 77—78 and arms 89—90 for raising and lowering the guide disks, we prefer to employ brackets 128—129, best shown in Fig. 7, which are rigidly connected to the levers 115 and are connected together by a rod 130 which is in turn connected to the arms 69—70 of the guide disks by a connecting rod 131 which corresponds with the connecting rod 91.

For use in treating listed corn the cultivator is first set with the disks arranged as shown in dotted lines in Fig. 2, so that they throw the dirt out from the plants and cut the weeds at each side of the trench. For the second cultivation the disks are set as shown in full lines in Fig. 2 and consequently serve to throw the dirt in toward the plants. The shovels 57 run in the ground not plowed by the disks and the two front disks of each pair serve to guide and steady the machine. The disk beams and also the guide disks can readily be removed by simply removing the brackets 63, so that the furrow-opener and guide disks may readily be attached to or removed from a regular cultivator, thus enabling the operator to use his machine to good advantage for cultivating either listed corn or for flat cultivation.

It will be noted that by our improved construction each of the disks may rise and fall independently in passing over obstructions, and that they may be adjusted independently by means of the hand-levers. Their journal bearings may also turn independently. A further advantage of our construction is that the cultivator disks being connected more directly to the lifting levers than the shovels they rise and fall quicker when the lifting lever is operated. Furthermore, greater pressure is transmitted to the disks than to the shovels, which is advantageous as the disks have to do more work and hence to press them down properly more pressure must be applied to them.

The guide disks being set in front of the frame of the machine do not carry the weight of the machine, which is sustained by the carrying wheels. The guide disks, however, serve to guide the machine and make it steadier in operation. Where the trench is deep the guide disks are set so as to throw them down farther, this being perfected by adjusting the position of the nuts 92 and 95. When desired all the disks may be raised clear of the ground together so as to facilitate turning around. In practice, the seat is locked against lateral swing, except for shallow cultivation. Many of the improvements hereinbefore described may be applied to single as well as double-row cultivators.

That which I claim as my invention, and desire to secure by Letters Patent, is,—

1. In a cultivator, the combination of a wheeled frame, a plurality of arches connected therewith and arranged end to end, cultivator gangs connected with said arches, oppositely-disposed bell-crank levers connected with said arches, respectively, and means for rocking said bell-crank levers simultaneously in opposite directions to move said arches toward or from each other.

2. In a cultivator, the combination of a wheeled frame, a plurality of arches connected therewith and arranged end to end, cultivator gangs connected with said arches, bell-crank levers connected with said arches, respectively, a hand-lever, and links connecting said hand-lever with said bell-crank levers for rocking the same to move said arches toward or from each other.

3. In a cultivator, the combination of a wheeled frame, a pair of arches connected therewith and arranged end to end, cultivator gangs connected with said arches, a seat-supporting bar, bell-crank levers fulcrumed upon said seat-supporting bar and connected with said arches, respectively, an operating lever, and means connecting said operating lever with said bell-crank levers for rocking the same to move the arches toward or from each other.

4. In a cultivator, the combination of a wheeled frame, a pair of arches connected therewith and arranged end to end, cultivator gangs connected with said arches, a laterally-swinging seat-supporting bar, bell-crank levers fulcrumed upon said seat-supporting bar and connected with said arches, respectively, an operating lever, and means connecting said operating lever with said bell-crank levers for rocking the same to move the arches toward or from each other.

5. In a listed-corn cultivator, the combination of a wheeled frame, an arch at the forward portion thereof, laterally-rigid beams connected with the end portions of said arch, cultivator disks, connecting means connecting said disks with said beams and arranged to be swung to one side or the other of said beams to cause the disks to throw the dirt toward or from the trench, a pair of guide disks pivotally connected with the arch, and means for raising and lowering said guide disks.

6. In a listed-corn cultivator, the combination of a wheeled frame, an arch at the forward portion thereof, laterally-rigid beams connected with the end portions of said arch, cultivator disks, connecting means connecting said disks with said beams and arranged to cause the disks to throw the dirt toward or from the trench, a pair of guide disks arranged in advance of the arch, and means for raising and lowering said guide disks.

7. In a cultivator, the combination of a wheeled frame, a pair of arches at the forward portion thereof arranged in line with each other, means suspending said arches so that they may swing laterally, means for moving said arches transversely of the frame, laterally-rigid beams connected with the end portions of said arches, cultivating devices carried by said beams, auxiliary beams also connected to said arches, cultivator disks connected with said auxiliary beams and arranged to be swung to different angular positions relatively to said first-mentioned cultivator beams, lever mechanism for raising and lowering said auxiliary beams, and means independent of said first-mentioned beams for exerting yielding downward pressure on said cultivator disks.

8. In a cultivator, the combination of a wheeled frame, a pair of arches at the forward portion thereof arranged in line with each other, means suspending said arches so that they may swing laterally, means for moving said arches transversely of the frame, laterally-rigid beams connected with the end portions of said arches, cultivating devices carried by said beams, auxiliary beams also connected to said arches, cultivator disks connected with said auxiliary beams and arranged to be swung to different angular positions relatively to said first-mentioned cultivator beams, lever mechanism for raising and lowering said auxiliary beams, and a pair of guide disks pivotally connected with each arch and arranged in advance thereof.

9. In a cultivator, the combination of a wheeled frame, a pair of arches at the forward portion thereof arranged in line with each other, means suspending said arches so that they may swing laterally, means for moving said arches transversely of the frame, laterally-rigid beams connected with the end portions of said arches, cultivating devices carried by said beams, auxiliary beams also connected to said arches, cultivator disks connected with said auxiliary beams and arranged to be swung to different angular positions relatively to said first-mentioned cultivator beams, lever mechanism for raising and lowering said auxiliary beams, a pair of guide disks pivotally connected with each arch and arranged in advance thereof, and means for raising and lowering said guide disks.

10. In a cultivator, the combination of a wheeled frame, an arch at the forward portion thereof and movable transversely of the frame, laterally-rigid beams connected with the end portions of said arch, a laterally-movable lever for shifting said arch transversely of the frame, cultivating devices carried by said beams, auxiliary beams connected with said arch, cultivator disks carried by said auxiliary beams, and means independent of said first-mentioned beams for exerting yielding downward pressure upon said cultivator disks.

11. In a cultivator, the combination of a wheeled frame, a pair of arches arranged end to end, beams connected with the end portions of said arches, shovels carried by said beams, auxiliary beams also connected with said arches, disks carried by said auxiliary beams, brackets pivotally connected with said arches and extending forward therefrom, and guide disks connected with said brackets.

12. In a cultivator, the combination of a wheeled frame, a pair of arches arranged end to end, beams connected with the end portions of said arches, shovels carried by said beams, auxiliary beams also connected with said arches, disks carried by said auxiliary beams, means for moving said arches toward and from each other, brackets pivotally connected with said arches and extending forward therefrom, and guide disks connected with said brackets.

13. In a cultivator, the combination of a wheeled frame, a pair of arches arranged end to end, beams connected with the end portions of said arches, shovels carried by said beams, auxiliary beams also connected with said arches, disks carried by said auxiliary beams, means for moving said arches toward and from each other, brackets pivotally connected with said arches and extending forward therefrom, guide disks connected with said brackets, and means for raising said guide disks.

14. In a cultivator, the combination of a wheeled frame, a front arch, cultivator beams connected with said arch, cultivating devices carried by said beams, guide disks in front of said arch and pivotally connected therewith, a lifting lever, and means connecting said lifting lever with one of said beams and with said guide disks, whereby by operating said lever said cultivator beam and the guide disks may be simultaneously lifted.

15. In a cultivator, the combination of a wheeled frame, a front arch, cultivator beams connected with said arch, cultivating devices carried by said beam, guide disks in front of said arch and pivotally connected therewith, a lifting lever, means connecting said lifting lever with one of said beams and with said guide disks, whereby by operating said lever said cultivator beam and the guide disks may be simultaneously lifted, and springs exerting yielding downward pressure upon said guide disks.

16. In a cultivator, the combination of a wheeled frame, a front arch, cultivator beams connected with said arch, disks carried by said beams, guide disks in front of said arch and connected therewith, a lifting lever, and means connecting said lifting lever with one of said beams and with said guide disks, whereby by operating said lever said cultivator beams and the guide disks may be simultaneously lifted.

17. In a cultivator, the combination of a wheeled frame, a front arch, cultivator beams connected with said arch, disks carried by said beams, guide disks in front of said arch and connected therewith, a lifting lever, means connecting said lifting lever with one of said beams and with said guide disks, whereby by operating said lever said cultivator beams and the guide disks may be simultaneously lifted, and springs exerting yielding downward pressure upon said disks.

18. In a cultivator, the combination of a wheeled frame, a front arch, laterally-rigid beams connected with said arch, cultivating devices connected with said beams, brackets connected with said arch and extending forward therefrom, guide disks carried by said brackets, a lifting lever means connecting said lifting lever with said brackets for raising said guide disks, and a spring for exerting downward pressure on said guide disks.

19. In a cultivator, the combination of a wheeled frame, an arch supported by said frame and movable transversely thereof, a lever for moving said arch transversely of the frame, cultivator beams connected with said arch, cultivating devices carried by said beams, auxiliary beams connected with said arch, cultivating devices carried by said auxiliary beams, and means independent of said first-mentioned beams for exerting yielding downward pressure on said auxiliary beams.

20. In a cultivator, the combination of a wheeled frame, a front arch, movable transversely of the frame, a lever for moving said arch transversely, cultivator beams connected with the end portions of said arch, cultivating devices carried by said beams, auxiliary beams connected with said arch, cultivating disks carried by said auxiliary beams, means independent of said first-mentioned beams for exerting yielding downward pressure on said auxiliary beams, and means for simultaneously lifting said main and auxiliary beams.

21. In a cultivator, the combination of a wheeled frame, a front arch, means supporting said arch so that it may move transversely of the frame, a lever for moving the arch transversely, cultivator beams connected with the end portions of said arch, cultivating devices carried by said beams, auxiliary beams connected with said arch, cultivating disks carried by said auxiliary beams, means independent of said first-mentioned beams for exerting yielding downward pressure on said auxiliary beams, and means for simultaneously lifting said main and auxiliary beams.

22. In a cultivator, the combination of a wheeled frame, a front arch, means supporting said arch so that it may move transversely of the frame, a lever for moving the arch transversely, laterally-rigid cultivator beams connected with the end portions of said arch, cultivating devices carried by said beams, auxiliary beams connected with said arch, cultivating disks carried by said auxiliary beams, means independent of said first-mentioned beams for exerting yielding downward pressure on said auxiliary beams, and means for simultaneously lifting said main and auxiliary beams.

23. In a cultivator, the combination of a wheeled frame, a laterally movable arch, cultivating devices connected with said arch, a pair of guide disks mounted to swing vertically in front of said cultivating devices, and means for lifting said guide disks.

24. In a cultivator, the combination of a wheeled frame, a laterally movable arch, cultivating devices connected with said arch, a pair of parallel guide disks mounted to swing vertically in front of said cultivating devices, and means for lifting said guide disks.

25. In a cultivator, the combination of a wheeled frame, a laterally movable arch, cultivating devices connected with said arch, and a pair of parallel guide disks mounted to swing vertically in advance of said cultivating devices.

26. In a cultivator, the combination of a wheeled frame, a laterally movable arch, cultivating devices connected with said arch, a pair of parallel guide disks mounted to swing vertically in advance of said cultivating devices, and means for lifting said cultivating devices and guide disks.

27. In a cultivator, the combination of a wheeled frame, cultivating devices, a pair of parallel guide disks mounted to swing vertically in advance of said cultivating devices, and means for simultaneously lifting said cultivating devices and guide disks.

CARL CHRISTENSEN.
CHARLES W. NOONEN.

Witnesses to signature of Carl Christensen:
  Chas. Walsh,
  Wm. R. Roud.

Witnesses to signature of Chas. W. Noonen:
  Robert F. Smith,
  A. W. Hawkins.

---

Copies of this patent may be obtained for five cents each, by addressing the "Commissioner of Patents, Washington, D. C."